April 24, 1928.

O. E. CLARK 1,666,959

LUBRICATOR

Original Filed March 15, 1923

Inventor
Omar E. Clark

By

Attorney

Patented Apr. 24, 1928.

1,666,959

UNITED STATES PATENT OFFICE.

OMAR E. CLARK, OF DENVER, COLORADO, ASSIGNOR TO THE DENVER ROCK DRILL MANUFACTURING COMPANY, OF DENVER, COLORADO, A CORPORATION OF DELAWARE.

LUBRICATOR.

Original application filed March 15, 1923, Serial No. 625,352. Divided and this application filed February 19, 1924. Serial No. 693,886.

The present invention relates more particularly to lubricators of the type employed in the supply lines or manifolds of the machines to be lubricated, as for example, air-operated rock drills, though not necessarily limited to these uses.

The primary object is to provide a simple structure of a novel character that will deliver oil in a sufficient quantity into the air or fluid stream, while the pressure is on the hose or conduit, and will promptly stop the delivery upon the reduction of the pressure, as for example, when the supply of air or motive fluid is cut off.

This application is a division of an application for patent made by me on March 15, 1923, Serial No. 625,352.

In the accompanying drawings:—

Figure 1:
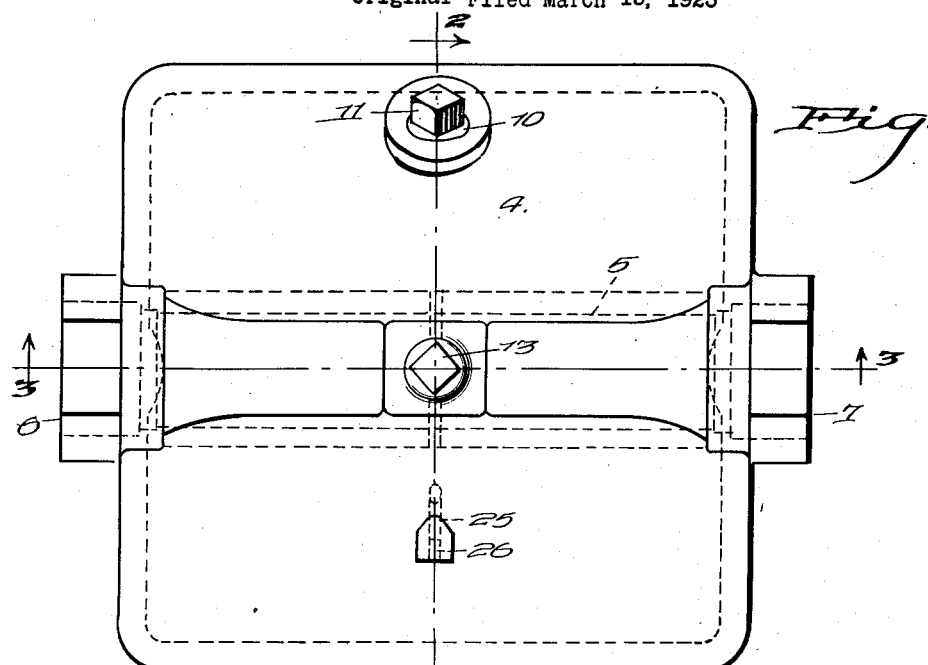

Figure 1 is a top plan view of the lubricator, and

Figure 2:
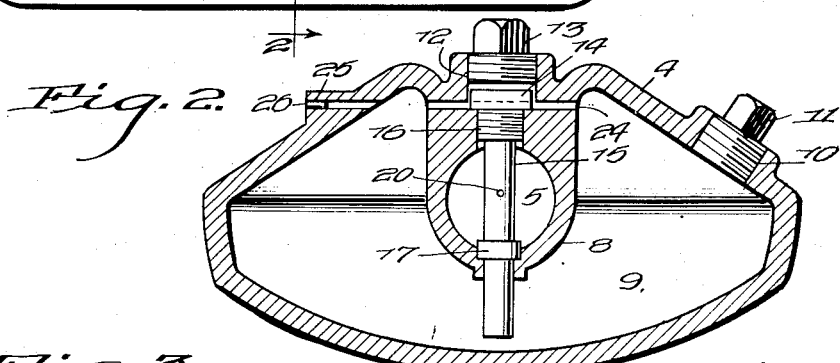
Figure 3:
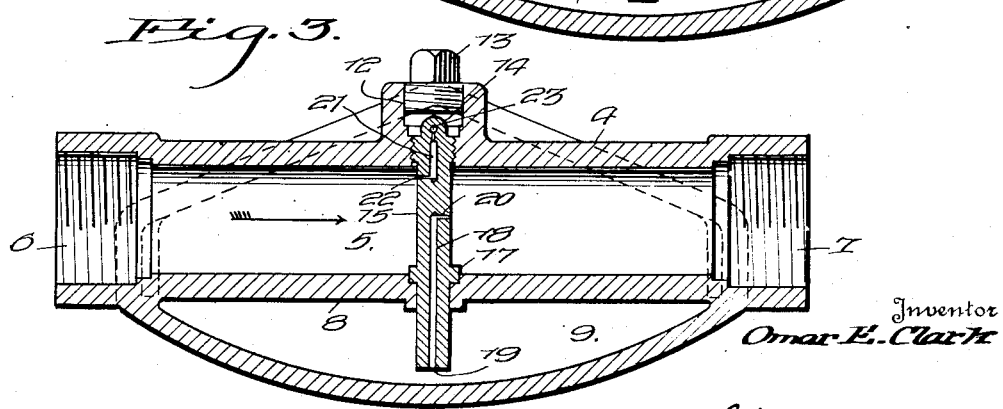

Figures 2 and 3 are sectional views respectively on lines 2—2 and 3—3 of Figure 1.

In the embodiment disclosed, an outer casing 4 is provided, through which extends a conduit or passageway 5 for the passage of air or other motive fluid. This passageway has an inlet nipple 6 and an outlet nipple 7, to which may be coupled the sections of the usual hose or other fluid conveying means. The passageway is walled, as shown at 8, from the main portion of the interior of the casing, and said portion forms a lubricant reservoir 9. A filling opening 10 in the outer casing wall affords access to the lubricant reservoir and is provided with a suitable closure, as for example, a removable threaded plug 11.

The top of the casing 4 is provided with a socket 12 closed by a removable plug 13 and in said socket is the head 14 of a stem 15 that extends transversely across the passageway 5 and depends into the lower portion of the reservoir 9. The head 14 preferably has a portion 16 that is threaded into the top of the wall 8, so as to fixedly secure the stem in place, and said stem also has a collar 17 that rests upon the lower portion of the wall 8. By referring to Figure 3 it will be noted that the lower portion of this stem has a longitudinal bore 18, forming a lubricant conduit, the lower end 19 of which constitutes an inlet opening into the lower portion of the reservoir. The upper end of the conduit has a lateral port 20 opening through the side of the stem into the passageway 5 and toward the outlet end of said passageway. Another conduit 21 in the upper end of the stem has an inlet port 22 opening laterally through the side of the said stem opposite to the port 20 and into the passageway 5. In other words the inlet port 22 faces the inlet end 6 of said passageway. The upper end of the conduit 21 is in communication with a transverse port 23 that opens into the chamber 12, and said chamber has communication with the upper end of the lubricant reservoir 9 through the medium of ports 24 drilled through the top wall of the passageway. These ports 24 are made possible by drilling a transverse hole 25 through the side of the casing 4 and afterwards closing this hole by a suitable plug 26.

In operation, assuming the reservoir 9 partially filled with oil, if air or other fluid under pressure is directed through the passageway 5, a portion of this fluid will enter the port 22 facing its direction of flow, and will thus find its way through the conduit 21, ports 23 and 24 into the upper portion of the lubricant reservoir. At the same time the fluid stream will cause a slight suction to take place through the port 20 and conduit 18, so that an overbalancing will take place, causing the lubricant to rise through the conduit 18 and escape by the port 20 into the air stream. Whenever the air is cut off, pressure in the passageway 5 is immediately reduced and this reduction will result in an equilibrium in the reservoir so that the outflow of oil will cease.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. A lubricator comprising a casing having a fluid passageway therethrough and a lubricant reservoir walled from the passageway and a single stem extending through the wall into the passageway and into the reservoir, said stem having a lubricant outlet conduit consisting of an inlet communicating with the lower portion of the reservoir and an outlet opening into the passageway, said stem also having a fluid supply conduit having an inlet opening into the passageway in a different direction from the outlet of the lubricant conduit and having an outlet opening into the upper portion of the reservoir.

2. A lubricator comprising a casing having a fluid passageway therethrough and a lubricant reservoir walled from the passageway, and a stem extending across the passageway into the lower portion of the reservoir, said stem having a lubricant conduit in its lower portion that has an inlet opening into the lower portion of the reservoir, and an outlet opening into the passageway, said stem also having a fluid supply conduit provided with an inlet opening into the passageway and an outlet in communication with the upper portion of the reservoir.

3. A lubricator comprising a casing having a fluid passageway therethrough and a lubricant reservoir walled from the passageway, and a stem extending across the passageway into the lower portion of the reservoir, said stem having a lubricant conduit in its lower portion that has an inlet opening into the lower portion of the reservoir and an outlet opening laterally through one side of the stem into the passageway, said stem also having a fluid supply conduit provided with an inlet opening into the passageway laterally through the side of the stem opposite to the lubricant conduit outlet, said fluid supply conduit having an outlet in communication with the upper portion of the reservoir.

4. A lubricator comprising a casing having a tubular fluid passageway therethrough, and a lubricant reservoir walled from said passageway, said walls having transverse openings, a stem extending across the passageway into the reservoir through said transverse openings, and means in the stem affording access of fluid from the passageway into the reservoir and the outlet of lubricant from the reservoir into the passageway.

5. A lubricator comprising a casing having a tubular fluid passageway therethrough and a lubricant reservoir walled from said passageway, said walls having transverse openings, a stem extending across the passageway into the reservoir through said transverse openings, means in the stem affording access of fluid from the passageway into the reservoir and the outlet of lubricant from the reservoir into the passageway, said casing having an opening giving access to one end of the stem, and a closure for the opening.

6. A lubricator comprising a casing and a fluid passageway extending therethrough and having its walls spaced from the bottom and top of the casing, forming a lubricant reservoir, and a stem extending across the fluid passageway into the upper and lower portions of the reservoir, said stem having one conduit opening into the fluid passageway and into the upper portion of the reservoir and having another conduit opening into the fluid passageway and into the lower portion of the reservoir.

7. A lubricator comprising a casing and a fluid passageway extending through the same and having walls spaced from the walls of the casing forming a lubricant reservoir within the casing, a stem extending across the passageway and into the reservoir on opposite sides of said passageway, said stem having conduits opening into the passageway and extending in opposite directions and also opening into the reservoir on opposite sides of the fluid passageway.

8. A lubricator comprising a casing having a fluid passageway therethrough and a lubricant reservoir, and a single stem extending transversely of the passageway and into the reservoir, said stem having separate normally open conduits, both in communication with the interior of the fluid passageway and in communication with the reservoir at different elevations.

9. A lubricator comprising a casing having a fluid passageway therethrough and a lubricant reservoir beneath the passageway, and a single stem extending transversely of the passageway and depending into the reservoir below said passageway, said stem having separate normally open conduits, both in communication with the interior of the fluid passageway, and in communication with the reservoir at different elevations.

10. A lubricator comprising a casing having a fluid passageway that opens through its opposite ends, the bottom wall of the passageway being spaced from the bottom of the casing and the space within the casing below the passageway forming a lubricant reservoir, a stem extending through the bottom wall of the passageway into the lubricant reservoir, said stem having a normally open lubricant conduit provided with a lower inlet end opening into the lower portion of the lubricant reservoir and an upper outlet end opening into the fluid passageway and said stem also having a fluid supply conduit with an inlet end opening into the fluid passageway and an outlet opening into the lubricant reservoir above the lubricant inlet of the lubricant conduit.

11. A lubricator comprising a casing having a fluid passageway that opens through its opposite ends, the upper wall of the casing forming the upper wall of the passageway and having an opening therethrough into said passageway, the bottom wall of the passageway being spaced from the bottom of the casing and the space within the casing below the passageway forming a lubricant reservoir, a stem extending through the bottom wall of the passageway into the lubricant reservoir, said stem having a normally open lubricant conduit provided with a lower inlet end opening into the lower portion of the lubricant reservoir and an upper outlet end opening into the fluid passageway, and said stem also having a fluid supply conduit with an inlet end opening into the fluid passageway and an outlet opening into the lubricant reservoir above the lubricant inlet of the lubricant conduit, said stem being accessible through the opening in the top wall of the casing and passageway, and a removable closure for said opening.

12. A lubricator comprising a casing and a fluid passageway extending through the casing, forming a lubricant reservoir within the casing, said casing having an opening therein, a stem in line with the opening and extending across the passageway and into the reservoir on the opposite side of the same, and conduits in the stem opening into the passageway and into different portions of the reservoir to respectively deliver fluid into the reservoir from the passageway and deliver lubricant from the reservoir into the passageway.

In testimony whereof, I affix my signature.

OMAR E. CLARK.